US012766903B2

(12) United States Patent
Sonsalla

(10) Patent No.: US 12,766,903 B2
(45) Date of Patent: Oct. 20, 2026

(54) RUNNING GEAR COMPONENT HAVING A STRUCTURAL PART, AND METHOD FOR PRODUCING SUCH A RUNNING GEAR COMPONENT

(71) Applicant: ZF Friedrichshafen AG, Friedrichshafen (DE)

(72) Inventor: Eike Christian Sonsalla, Wagenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 211 days.

(21) Appl. No.: 18/565,189

(22) PCT Filed: May 6, 2022

(86) PCT No.: PCT/EP2022/062323

§ 371 (c)(1),
(2) Date: Nov. 29, 2023

(87) PCT Pub. No.: WO2022/253524

PCT Pub. Date: Dec. 8, 2022

(65) Prior Publication Data

US 2024/0278611 A1 Aug. 22, 2024

(30) Foreign Application Priority Data

Jun. 2, 2021 (DE) ..................... 10 2021 205 621.0

(51) Int. Cl.
*B60G 7/00* (2006.01)
*B60G 17/019* (2006.01)

(52) U.S. Cl.
CPC ............. *B60G 7/001* (2013.01); *B60G 7/005* (2013.01); *B60G 17/01908* (2013.01);
(Continued)

(58) Field of Classification Search
CPC ... F16C 11/06; F16C 11/0619; F16C 11/0623; F16C 11/0628; F16C 11/0633; F16C 11/0638
See application file for complete search history.

(56) References Cited

U.S. PATENT DOCUMENTS 7,357,036 B2 4/2008 Steprath
10,252,595 B2 4/2019 Haskamp et al.
(Continued)

FOREIGN PATENT DOCUMENTS

DE 10 2018 216 061 A1 3/2020
DE 10 2019 201 521 A1 8/2020
(Continued)

OTHER PUBLICATIONS

Machine Translation (Espacenet) of DE 102020206438, generated Feb. 18, 2026; 28pgs (Year: 2020).*
(Continued)

*Primary Examiner* — Daniel J Wiley
(74) *Attorney, Agent, or Firm* — Secant IP, PLLC

(57) ABSTRACT

The invention relates to a chassis component with a structural part which comprises at least one strut section with an open cross-section shape, wherein in an end area of the strut section a first wall section and a second wall section are formed, the first wall section has a first joint-receiving opening and the second wall section has a second joint-receiving opening. The two joint-receiving openings are arranged opposite one another, and a joint housing of a joint is arranged in the two joint-receiving openings. In order to improve the arrangement of an additional component, in particular a sensor element, on the chassis component and make it simpler and/or less costly, the said additional component is fixed between the two wall sections and on the joint housing by means of a clamping fit and/or a press fit.

9 Claims, 4 Drawing Sheets

(52) U.S. Cl.
CPC ................. *B60G 2204/1162* (2013.01); *B60G 2204/416* (2013.01); *B60G 2206/017* (2013.01); *B60G 2206/16* (2013.01); *B60G 2206/82092* (2013.01); *B60G 2400/0516* (2013.01)

(56) References Cited

U.S. PATENT DOCUMENTS

| | | | |
|---|---|---|---|
| 11,203,240 B2 | 12/2021 | Bowden | |
| 11,364,758 B2 | 6/2022 | Sieve et al. | |
| 11,498,380 B2 | 11/2022 | Stratmann et al. | |
| 11,524,539 B2 | 12/2022 | Sieve et al. | |
| 11,566,661 B2 | 1/2023 | Bronswick et al. | |
| 2020/0114717 A1 | 4/2020 | Stratmann et al. | |
| 2020/0331313 A1* | 10/2020 | Bowden, Jr. | B60G 7/001 |
| 2021/0262517 A1 | 8/2021 | Bronswick et al. | |
| 2021/0309061 A1 | 10/2021 | Sieve | |
| 2023/0173867 A1 | 6/2023 | Berger et al. | |
| 2023/0241941 A1 | 8/2023 | Berger et al. | |

FOREIGN PATENT DOCUMENTS

| | | | | |
|---|---|---|---|---|
| DE | 102020206438 A1 * | 11/2021 | | B60G 17/019 |
| EP | 2 000 335 A2 | 12/2008 | | |

OTHER PUBLICATIONS

European Patent Office, International Search Report issued in International patent application PCT/EP2022/062323 (Jul. 12, 2022).
European Patent Office, Written Opinion issued in International patent application PCT/EP2022/062323 (Jul. 12, 2022).
German Patent Office, Office Action issued in German patent application No. 10 2021 205621.0 (Jan. 21, 2022).

* cited by examiner

RUNNING GEAR COMPONENT HAVING A STRUCTURAL PART, AND METHOD FOR PRODUCING SUCH A RUNNING GEAR COMPONENT

RELATED APPLICATIONS

This application claims the benefit under 35 U.S.C. § 371 as a U.S. National Phase Application of application no. PCT/EP2022/062323, filed on 6 May 2022, which claims the benefit of German Patent Application no. 10 2021 205 621.0 filed 2 Jun. 2021, the contents of which are hereby incorporated herein by reference in their entireties

FIELD OF THE DISCLOSURE

The invention relates to a chassis component, in particular a chassis of a vehicle, having a structural part comprising at least one strut section with an open cross-section shape, wherein in an end area of the strut section a first wall section and a second wall section are formed, the first wall section having a first joint-receiving opening and the second wall section having a second joint-receiving opening, the two joint-receiving openings being arranged opposite one another and a joint housing of a joint being arranged in each of the two joint-receiving openings. In addition, the invention relates to a method for producing a chassis component, in particular for the chassis of a vehicle, in which method a structural part is prepared which comprises at least one strut section with an open cross-section shape, wherein in an end area of the strut section a first wall section and a second wall section are formed, the first wall section having a first joint-receiving opening and the second wall section having a second joint-receiving opening, with the two joint-receiving openings arranged opposite one another and a joint housing of a joint being arranged in the two joint-receiving openings.

BACKGROUND

A chassis component of this type is known from DE 10 2020 206 438 A1. In that case, a sensor element is arranged in an inside space of a strut section such that a sensor housing of the sensor element extends outward through a passage opening in a wall of the strut section. Thus, the said passage opening must first be formed in the wall and the sensor housing must be fixed in a suitable manner to the wall or the strut section. This incurs additional effort and cost for the production of such a chassis component or for the arrangement of the sensor element.

SUMMARY

The purpose of the present invention is to develop further a chassis component and/or a method of the type mentioned to begin with, in such manner that the arrangement of an additional component, in particular a sensor element on the chassis component, is improved and/or made simpler and/or less costly. In particular, an alternative embodiment should be provided.

The objective to which the invention relates is achieved by a chassis component and/or a method as disclosed herein Preferred further developments of the invention emerge from the subordinate claims and from the description given in what follows.

Thus, the invention relates to a chassis component. Such a chassis component can be suitable for use in a chassis of a vehicle, in particular a motor vehicle. Preferably, the chassis component is built into a chassis. A chassis component can in general terms be a chassis support, a cross-member, an axle support, a flange joint, a wheel carrier, or a chassis control arm. For example, the chassis component is in the form of a two-point control arm or a multi-point control arm. The chassis component comprises a structural part. In particular, the structural part determines a shape and/or design of the chassis component. Preferably the structural part is made strong enough to keep its shape. The structural part can be made of a metal or sheet-metal. In particular, the structural part is in the form of a sheet-metal component. The structural part comprises at least one strut section with an open cross-section shape. In particular the structural part is made with an open cross-section. Preferably, owing to the design of the strut section and/or the structural part the open cross-section is in the form of a profile open on one side. In particular, by virtue of the open cross-section shape, it has an at least partially free inside space. In an end section of the strut section a first wall section and a second wall section are formed. The first wall section has a first joint-receiving opening and the second wall section has a second joint-receiving opening. The two joint-receiving openings are arranged opposite one another. In the two joint-receiving openings a joint housing of a joint is arranged. In particular, the joint housing of the joint is press-fitted into the two joint-receiving openings. A central longitudinal axis of the joint can coincide with the central longitudinal axes of the two joint-receiving openings. The joint can be in the form of a ball joint or a ball-and-pin joint or a ball-and-sleeve joint. Alternatively, the joint can be in the form of an elastomer bearing or a rubber bearing. For example, an outer sleeve of the joint can at the same time form the joint housing. Inside the joint an inner joint portion can be fitted so that it can move, in particular swivel and/or tilt and/or rotate. The inner joint portion can be a ball sleeve or an inner sleeve or a ball pin.

According to the invention, an additional component is fixed between the two wall sections and on the joint housing by means of a clamping fit and/or a press fit.

In this case it is advantageous that, by virtue of the clamping and/or press fit of the additional component between the two wall sections and on the joint housing, a simply and/or inexpensively produced arrangement of the additional component on the chassis component is made possible. In particular, the additional component is held by clamping and/or press-fitting between the two wall sections and on the joint housing. In particular, the additional component is held directly against the joint housing.

According to a further embodiment, the first wall section has a first flange for forming the first joint-receiving opening and the second wall section has a second flange for forming the second joint-receiving opening. In particular the first flange is in the form of a first passage opening and the second flange is in the form of a second passage opening. The two flanges are aligned with one another, and the additional component is arranged and/or clamped at least partially between the two flanges. In particular, the additional component is at least partially arranged and/or clamped in a gap between the two flanges. This enables a simple and at the same time room- or space-saving arrangement of the additional component on the chassis component.

According to a further development, the additional component is fixed by means of the joint housing press-fitted into the two joint-receiving openings, with interlock and/or by friction force, on the joint housing and between the two wall sections, in particular between the two flanges of the wall sections. Thus, there is no need, for example, for any machining of the strut section or the structural part or either of the two wall sections in order to position the additional component.

The additional component can have at least one first raised portion and/or at least one first recess. Preferably, in order to fix the position of the additional component the at least one raised portion and/or the at least one recess of the additional component engages on the chassis component in a correspondingly shaped further recess and/or a further raised portion, respectively, of the first wall section and/or the second wall section and/or the joint housing. In that way an interlock can be produced between the additional component and the first wall section and/or the second wall section and/or the joint housing. In particular, owing to this interlock the location and/or position of the additional component relative to the strut section and/or the joint is predetermined.

The additional component can comprise a closed or open ring. Alternatively, the additional component can be in the form of such a closed or open ring. To fix the additional component the ring is arranged between the two wall sections, in particular between the two flanges of the wall sections. The ring surrounds an outside of the joint housing and is held on the joint housing preferably with interlock and/or by friction. The configuration as a ring can enable a simple clipping-on or snapping-on of the additional component onto the outside of the joint housing between the two wall sections. This further facilitates assembly. Moreover, an open ring enables particularly simple dismantling and/or unclipping of the additional component. That can be advantageous, for example, if the additional component is defective and has to be replaced.

In a further embodiment, the additional component comprises a first sensor element. The first sensor element cooperates with a further sensor element, the said further sensor element being arranged on an inner portion of the joint. Preferably, the first sensor element and the further sensor element are part of a sensor device, in particular an angle-measuring device for determining a position of the inner joint portion fitted movably into the joint housing relative to the joint housing and/or the strut section. Thus, by means of the angle-measuring device, a relative displacement of the chassis component about at least one rotation axis of the joint can be detected and/or measured. Preferably the first sensor element is a sensor sensitive to magnetic fields, for example a Hall sensor. The further sensor element can be a magnet. When the inner joint portion and therefore also the further sensor element moves, the magnetic field changes relative to the first sensor element and this can be detected by the first sensor element. In that way an angle and/or a change of angle can be determined. Thus, by means of the sensor device or angle-measurement device, a displacement of the chassis component relative to the inner joint portion and about one, or exactly one, rotation axis of the joint can be detected.

Preferably, the first wall section and/or the second wall section and/or the joint housing has/have a clearance and/or a non-magnetic screening section between the first sensor element and the further sensor element. The first sensor element and/or the further sensor element can be arranged close to the clearance and/or to the non-magnetic screening section. In that way, the first sensor element and/or the further sensor element can cooperate with one another through the clearance and/or the non-magnetic screening section. The non-magnetic screening section can consist of a plastic material or aluminum.

The structural component can be in the form of a sheet-metal control arm. In particular, the structural component is preferably made in one piece by a shaped sheet. As the material for the sheet, steel or aluminum can be used. At least the strut section has an open U-shaped or C-shaped cross-section. The two wall sections can form the two arms of the U-shaped cross-section, or they can extend outward from those arms.

Particularly advantageous is a method for producing a chassis component according to the invention. The chassis component to be produced can be designed and suitable for use in a chassis of a vehicle, particularly a motor vehicle. In particular, the method can be used to produce a chassis component according to the invention as described above. According to the method, a structural component is prepared, which comprises at least one strut section with an open cross-section shape. In an end area of the strut section a first wall section and a second wall section are formed. The first wall section has a first joint-receiving opening and the second wall section has a second joint-receiving opening. The two joint-receiving openings are arranged opposite one another and a joint housing is arranged in the two joint-receiving openings.

According to the invention, before the joint housing is positioned in the two joint-receiving openings an additional component is arranged between the two wall sections. By virtue of the subsequent positioning of the joint housing in the two joint-receiving openings, the additional component is fixed between the two wall sections and on the joint housing by a clamping fit and/or a press fit.

In a further embodiment, when the joint housing is press-fitted, to fix the position of the additional component, at least one first raised portion and/or at least one first recess of the additional component engages, particularly with interlock, in a correspondingly shaped further recess and/or further raised portion of the first wall section and/or the second wall section and/or the joint housing. In that way a predetermined positioning and/or location of the additional component relative to the chassis component and/or the joint can be defined and/or specified.

According to a further development, a closed ring or an open ring of the additional component is arranged between the two wall sections, in particular between two flanges of the wall sections, before the joint housing is press-fitted. After the joint housing has been press-fitted, an outside of the joint housing is surrounded by the ring, whereby the ring is preferably held with interlock and by friction onto the joint housing.

In particular, the additional component with a first sensor element is arranged between the two wall sections in such manner that a clearance and/or a non-magnetic screening section of the first wall section, the second wall section and/or the joint housing is arranged between the first sensor element and a further sensor element that cooperates with the first sensor element, the said further sensor element being arranged on an inner joint portion of the joint.

In particular, the chassis component produced in accordance with the method according to the invention is a chassis component according to the invention as described earlier. Preferably, the method is developed further in accordance with the features explained in connection with the chassis component according to the invention as described herein. Furthermore, the chassis component described herein can be developed further in accordance with the features explained in connection with the said method.

BRIEF DESCRIPTION OF THE DRAWINGS

Below, the invention is explained in greater detail with reference to the figures, in which the same indexes denote the same, similar or functionally equivalent components or elements, and which show.

DETAILED DESCRIPTION

Figure 1:
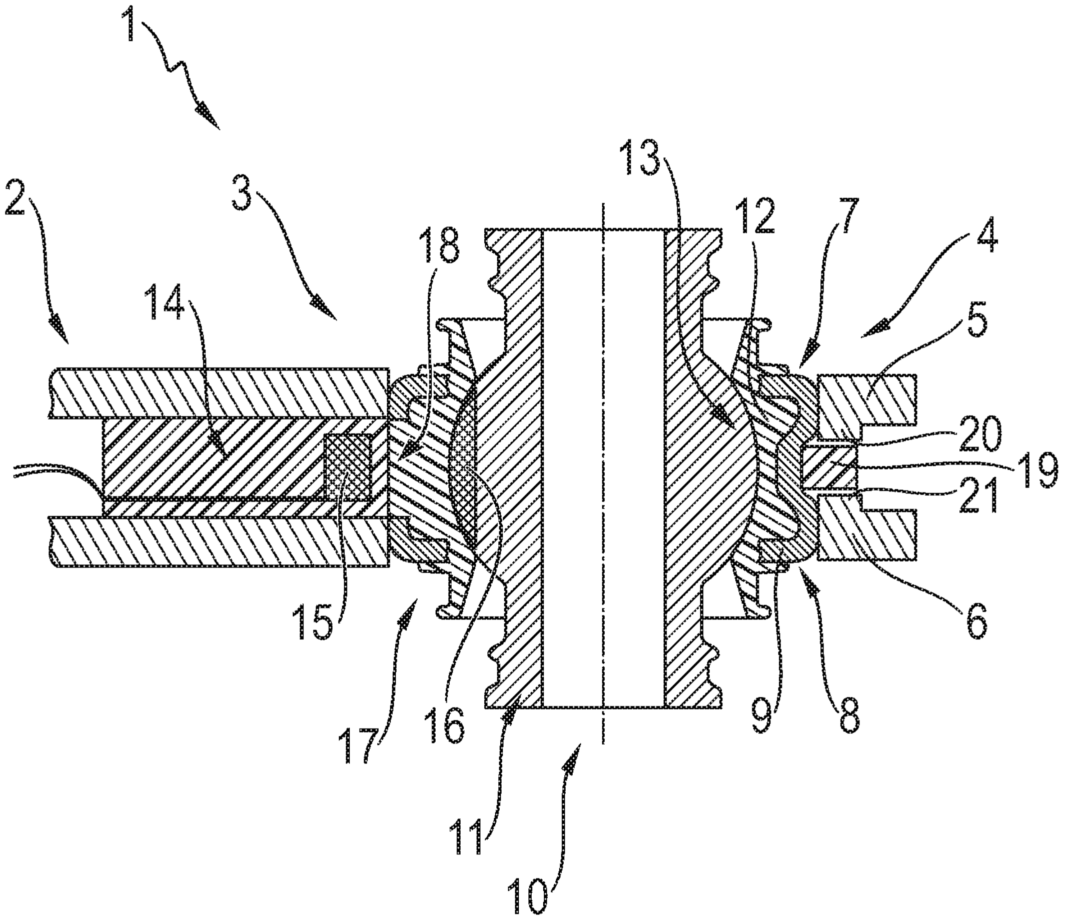
FIG. 1: Part of a sectioned side view of a chassis component according to the invention.

FIG. 1 shows part of a sectioned side view of a chassis component 1 according to the invention. In this example embodiment the chassis component 1 is in the form of a chassis control arm. The chassis component 1 comprises a structural part 2. In this example embodiment the structural part 2 is formed of a shaped sheet. The structural part 2 has a strut section 3. At least the strut section 3 of the structural part 2 has an open cross-section shape. In other words, in this example embodiment it is in the form of a profile open on one side. In an end area 4 of the strut section 3 a first wall section 5 and a second wall section 6 are formed. The first wall section 5 has a first joint-receiving opening 7 and the second wall section 6 has a second joint-receiving opening 8. The two joint-receiving openings 7, 8 are arranged opposite one another. In this example embodiment the two wall sections 5, 6 are orientated parallel to one another and form arms of the open cross-section, which is in this case U-shaped.

The joint-receiving openings 7, 8 in this example embodiment are formed mirror-symmetrically to one another. In the two joint-receiving openings 7, 8 is arranged a joint housing 9 of a joint 10. In this example embodiment the joint housing 9 is press-fitted into the two joint-receiving openings 7, 8. In this example embodiment the joint 10 is in the form of a ball sleeve joint. Correspondingly, the joint 10 comprises an inner joint portion 11, in this case in the form of a ball sleeve. The inner joint portion 11 can pivot in a bearing shell 12 of the joint 10. For that, in this example embodiment a ball section 13 of the joint inner portion 11 is fitted and able to swivel, rotate and/or tilt in the said bearing shell 12.

An additional component 14 is fixed between the two wall sections 5, 6 and on the joint housing 9 by means of a clamping fit and a press fit. The additional component comprises a first sensor element 15. In this example embodiment the first sensor element 15 is a sensor sensitive to magnetic fields, namely a Hall sensor. The first sensor element 15 cooperates with a further sensor element 16. The further sensor element 16 in this example embodiment is in the form of a magnet. Furthermore, the further sensor element 16 is arranged in the joint housing. In this example embodiment the further sensor element 16 is formed as part of the ball section 13. The first sensor element 15 and the further sensor element 16 are components of an angle-measuring device 17. The two sensor elements 15, 16 are arranged close to one another and with as small a distance between them as possible.

In this example embodiment the additional component 14 with the first sensor element 15 is arranged between the two wall sections 5, 6. Moreover, in this example embodiment the joint housing 9 has a clearance 18 located between the first sensor element 15 and the further sensor element 16. Thus, the first sensor element 15 and the further sensor element 16 cooperate with one another through the clearance 18. In this example embodiment the clearance 18 is filled with the material of the bearing shell 12. In this case the bearing shell material 12 is a plastic material and is therefore a non-magnetic screening material.

In this example embodiment the joint housing 9 is made of a metal. Moreover, the additional component 14 forms a housing for the first sensor element 15, or has such a housing, in which case the said housing is made from a plastic material. In this example embodiment the additional component 14 comprises a ring 19. Moreover, in this example embodiment the ring 19 is closed. Furthermore, the ring 19 is arranged between the two wall sections 5, 6.

In this example embodiment the first wall section 5 has a first flange 20 and the second wall section has a second flange 21. The first flange 20 and the second flange 21 are in each case made as passage openings for forming the first joint-receiving opening 7 and the second joint-receiving opening 8 respectively. The two flanges 20, 21 are orientated toward one another and the additional component 14 with the ring 19 is arranged between the two flanges 20, 21. In this example embodiment the ring 19 is not on the flanges 20, 21. Alternatively, the ring 19 can rest on the two flanges 20, 21 or can be clamped between the two flanges 20, 21.

Furthermore, the ring 19 surrounds an outside of the joint housing 9 and rests on the joint housing 9 or its outside in an interlocked and frictional manner.

Figure 2A:
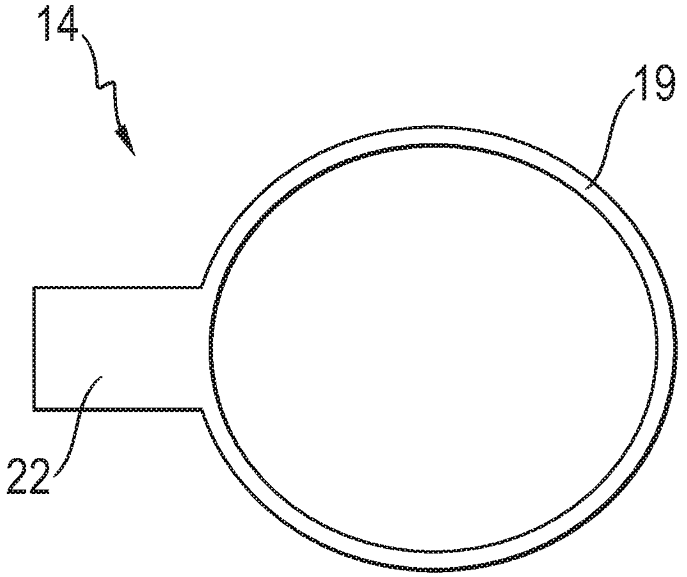
FIG. 2*a*: A view from above, of a schematically represented first additional component for the chassis component according to the invention shown in FIG. 1, FIG. 2*b*: A view from above, of a schematically represented further additional component for the chassis component according to the invention.

FIG. 2*a* shows a view from above of a schematically represented first additional component 14 for the chassis component 1 according to FIG. 1. The closed ring 19 of the additional component 14 can be seen clearly. From the ring 19 an extension 22 reaches outward and away. As is evident from FIG. 1, the first sensor element 15 (not shown here) is embedded inside the said extension 22.

Figure 2B:
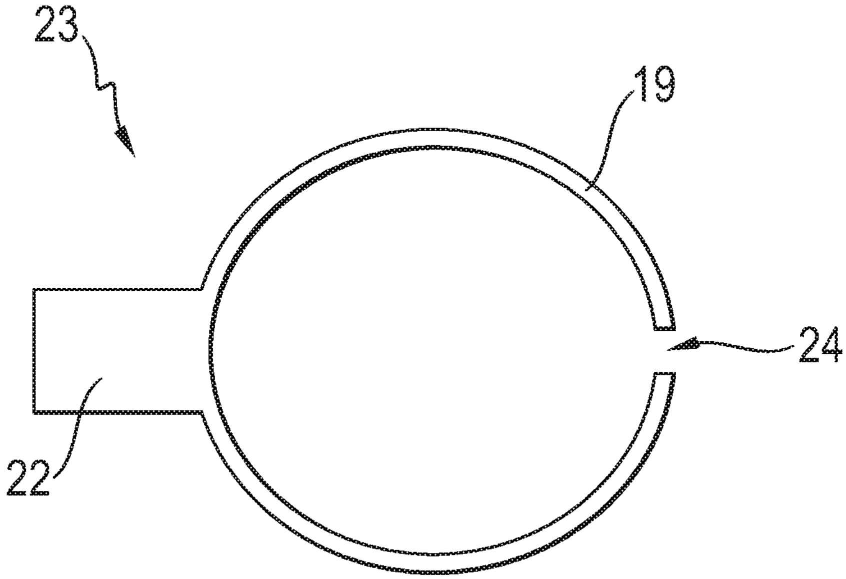

FIG. 2*b* shows a view from above of a schematically represented further additional component 23 for the chassis component 1 according to FIG. 1. The structure and function of the additional component 23 correspond essentially to those of the additional component 14. Accordingly, to avoid repetitions reference should be made to the previous descriptions relating to FIGS. 1 and 2*a*. Otherwise than in the additional component 14, the ring 19 of the additional component 23 shown here has a gap 24. Thus, the ring 19 in this example embodiment is in the form of an open ring. In this case the gap 24 is formed on a side of the ring 19 opposite the extension 22. Otherwise than with a closed ring 19, as in FIG. 2*a*, an open ring 19 simplifies the fitting or dismantling of the additional component 23 by means of a snap-fit connection between the open ring 19 and the joint housing 9 in the manner of FIG. 1.

Figure 3:
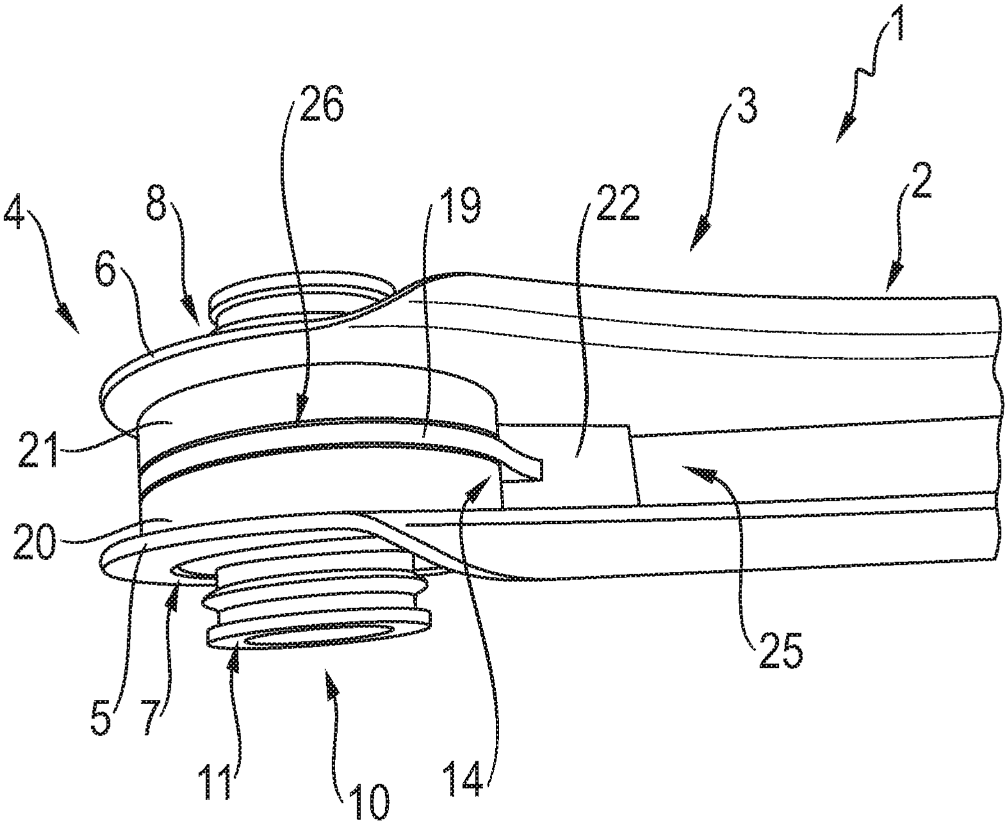
FIG. 3: Part of a first perspective view of the chassis component according to the invention shown in FIG. 1, and FIG. 4: Part of a further perspective view of the chassis component according to the invention shown in FIG. 1.

FIG. 3 shows part of a first perspective view of the chassis component 1 according to the invention, shown in FIG. 1. Owing to the cross-section shape of the strut section 2 open on one side, a free inside space 25 is formed in which the extension 22 of the additional component 14 is arranged. In this example embodiment the strut section 2 has an essentially U-shaped cross-section. Between the two flanges 20, 21 is a gap 26, into which the ring 19 of the additional component 14 is fitted.

Figure 4:
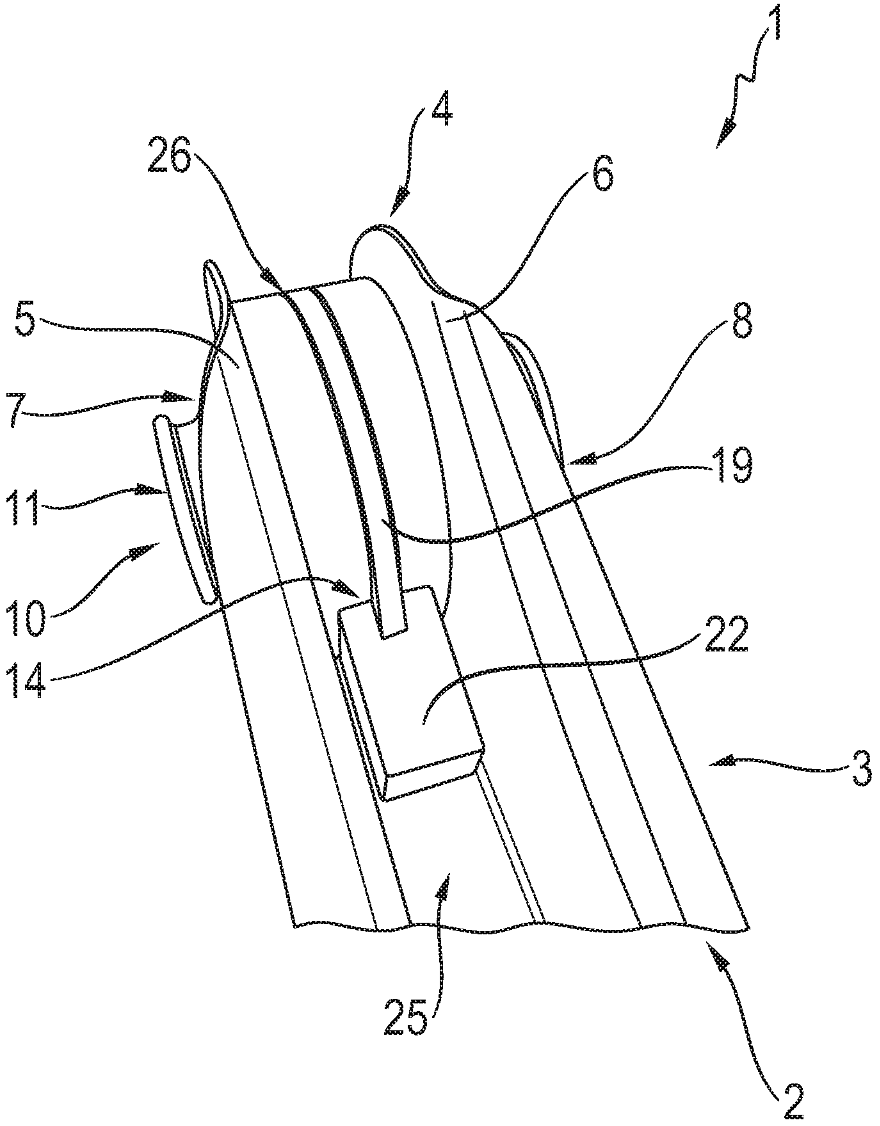

FIG. 4 shows part of a further perspective view of the chassis component 1 according to the invention, shown in FIG. 1. To produce the chassis component 1, the structural part 2 is made first. Then, and before the joint 10 is arranged in the two joint-receiving openings 7, 8, the additional component 14 is positioned between the two wall sections 5, 6. To do that, the extension 22 is positioned in the inside space 25 and the ring 19 is arranged between the two flanges 20, 21. After that, the joint housing 9 according to FIG. 1 is arranged or press-fitted into the two joint-receiving openings 7, 8. At the same time the joint housing 9 is press-fitted into the ring 19. Correspondingly, the additional component 14 is arranged between the two wall sections 5, 6 or between the two flanges 20, 21 and at the same time fixed onto the joint housing 9 by means of a clamping fit and/or a press fit.

INDEXES

1 Chassis component
2 Structural part
3 Strut section
4 End area
5 First wall section
6 Second wall section
7 First joint-receiving opening
8 Second joint-receiving opening
9 Joint housing
10 Joint
11 Inner portion of the joint
12 Bearing shell
13 Ball section
14 Additional component
15 First sensor element
16 Further sensor element
17 Angle-measuring device
18 Clearance
19 Ring
First flange
21 Second flange
22 Extension
23 Additional component
24 Gap
25 Inside space
26 Gap

The invention claimed is:

1. A chassis component with a structural part, comprising:

at least one strut section having an open cross-section shape and having an end area with a first wall section and a second wall section, the first wall section defining a first joint-receiving opening and the second wall section defining a second joint-receiving opening arranged opposite the first joint-receiving opening;

a joint housing of a joint arranged in the first and second joint-receiving openings;

an additional component fixed between the first and second wall sections and held on the joint housing by means of a clamping fit and/or a press fit, the additional component including a first sensor element; and a second sensor element which cooperates with the first sensor element, wherein the second sensor element is arranged on a joint inner portion of the joint, and the first wall section and/or the second wall section and/or the joint housing comprises a clearance and/or a non-magnetic screening section between the first sensor element and the second sensor element, wherein the first sensor element and the second sensor element are parts of an angle-measuring device configured for determining a position of the joint inner portion relative to the joint housing and/or to the strut section when the joint inner portion is fitted into the joint.

2. The chassis component according to claim 1, wherein the first wall section comprises a first flange which forms the first joint-receiving opening and the second wall section comprises a second flange which forms the second joint-receiving opening, wherein the first flange is oriented toward the second flange and the additional component is arranged and/or clamped at least partially between the first flange and the second flange.

3. The chassis component according to claim 2, wherein:

the additional component is fixed with interlock and by friction onto the joint housing and arranged between the first and second flanges by a press fit of the joint housing into the first and second joint-receiving openings; and the first wall section and/or the second wall section and/or the joint housing defines a further recess and/or a further raised portion;

the additional component defines a corresponding first raised portion and/or at least a first recess that engages the corresponding further recess and/or further raised portion thereby fixing a position of the additional component.

4. The chassis component according to claim 1, wherein:

the additional component comprises a closed or an open ring or the additional component is in the form of such a ring; and the additional component is arranged between the first and second flanges of the wall sections, surrounds an outside of the joint housing, and is held onto the joint housing by interlock and/or by friction.

5. The chassis component according to claim 1, wherein:

the structural part is in the form of a sheet-metal control arm;

the strut section defines an open U-shaped or an open C-shaped cross-section; and the joint is a ball sleeve joint or an elastomer bearing.

6. A method for producing a chassis component, comprising:

preparing a structural part comprising at least one strut section defining an open cross-section shape;

forming a strut section having an end area with a first wall section and a second wall section, wherein the first wall section defines a first joint-receiving opening and the second wall section defines a second joint-receiving opening arranged opposite the first joint-receiving opening;

arranging an additional component between the two wall sections;

arranging a first sensor element of the additional component between the two wall sections; and arranging a joint housing of a joint in the first and second joint-receiving openings, thereby fixing the additional component between the first and second wall sections and on the joint housing by means of a clamping fit and/or a press fit;

arranging a second sensor element on an inner joint portion of the joint, the second sensor element cooperating with the first sensor element, wherein a clearance and/or a non-magnetic screening section of the first wall section and/or the second wall section and/or the joint housing is between the first sensor element and the second sensor element.

7. The method according to claim 6, further comprising:

pressing the joint housing in the first and second joint-receiving openings; and arranging at least a first raised portion and/or at least a first recess of the additional component in a correspondingly shaped further recess and/or a further raised portion of the first wall section and/or the second wall section.

8. The method according to claim 7, wherein arranging the first raised portion and/or the first recess of the additional component is performed with interlock.

9. The method according to claim 7, further comprising:

arranging, prior to pressing the joint housing in the first and second joint-receiving openings, a closed or open ring of the additional component between the first and second flanges;

surrounding, after pressing the joint housing in the first and second joint-receiving openings, an outside of the joint housing by the closed or open ring; and applying interlock and friction to hold the ring onto the joint housing.

* * * * *